United States Patent [19]

Cordes

[11] Patent Number: 5,021,933
[45] Date of Patent: Jun. 4, 1991

[54] ILLUMINATED MAGNIFYING GLASS

[75] Inventor: Werner Cordes, Hamburg, Fed. Rep. of Germany

[73] Assignee: Aristo Graphic Systeme GmbH & Co. KG, Hamburg, Fed. Rep. of Germany

[21] Appl. No.: 520,751

[22] Filed: May 9, 1990

[30] Foreign Application Priority Data

Sep. 5, 1989 [DE] Fed. Rep. of Germany ....... 3915119

[51] Int. Cl.⁵ .................. F21V 33/00; G02B 27/02
[52] U.S. Cl. ............................ 362/109; 362/157; 362/253; 350/235
[58] Field of Search ........... 362/103, 157, 253, 31; 350/235, 242, 243, 250, 319, 321

[56] References Cited

U.S. PATENT DOCUMENTS

| | | | |
|---|---|---|---|
| 1,909,662 | 5/1933 | Conners | 362/109 |
| 2,586,723 | 2/1952 | Sakols | 362/109 |
| 3,945,717 | 3/1976 | Ryder et al. | |
| 4,751,615 | 6/1988 | Abrams | 362/31 |
| 4,859,032 | 8/1989 | Feinbloom | 350/235 |

FOREIGN PATENT DOCUMENTS

| | | |
|---|---|---|
| 481399 | 8/1929 | Fed. Rep. of Germany |
| 3520293Cl | 4/1986 | Fed. Rep. of Germany |
| 498848 | 12/1988 | Fed. Rep. of Germany |
| 3810325A1 | 1/1989 | Fed. Rep. of Germany |
| 3915119Cl | 6/1990 | Fed. Rep. of Germany |

Primary Examiner—Ira S. Lazarus
Assistant Examiner—Richard R. Colt
Attorney, Agent, or Firm—Fitzpatrick, Cella, Harper & Scinto

[57] ABSTRACT

A magnifying glass device has a lens body comprised of a cylindrical portion and a convexly curved lens section both of which are rotationally symmetrical with respect to the cylindrical axis of the cylindrical portion. In the area between the circumferential surface of the cylindrical portion and the path of an edge light beam of the lens section passing through the cylindrical portion, at least one lamp is provided. An air gap is formed in the central area between facing surfaces of the cylindrical portion and the lens section. The light emitted by the lamp is substantially totally reflected by the facing surface of the cylindrical portion. Therefore, the lamp will not be seen by the user, but will provide good illumination for the surface viewed through the magnifying glass device.

20 Claims, 2 Drawing Sheets

ILLUMINATED MAGNIFYING GLASS

BACKGROUND OF THE INVENTION

1. Field of the Invention

The present invention relates to an illumination magnifying glass arrangement having a magnifying glass body including a cylindrical portion and a convexly curved lens section disposed on top of the cylindrical portion. Both the cylindrical portion and the curved lens section are rotationally symmetrical with respect to the cylindrical axis of the cylindrical portion.

2. Background of the Invention

In connection with a known magnifying glass arrangement of this type (German Patent DE-PS No. 35 20 293), which is particularly suitable for use in connection with digitizing tablets, a coil for the generation or detection of a magnetic field is disposed in the outer circumferential area of the cylindrical portion. The coil is placed in such a way that it is located in the area between the circumferential surface of the cylindrical portion and the path of edge light beams passing through the edge of the lens section and the cylindrical portion. Therefore, the coil is not visible to the viewer when looking through the body of the magnifying glass at the data on the digitizer. This is because the beam of light falling vertically with respect to the data on the outer edge of the lens section is deflected inwardly by the lens section in the direction of the cylindrical axis in such a way that, between it and the outer circumferential surface of the cylindrical portion, an area remains which is unrecognizable to the viewer because of the optical course of the edge light beam. For this reason, a coil located in this area is not visible and the viewer only has the impression that this part of the lens section is "opaque".

When using magnifying glasses it is often desired to further illuminate the area to be viewed. For this purpose, normally either a light source is provided above the magnifying glass body, the light from which falls through the magnifying lens body itself onto the surface to be viewed, or the surface to be viewed is illuminated from below. In the first case it is difficult to avoid dazzling light reflections, and often the light reaching the magnifying glass body is partially shielded by the viewer. Normally, illumination from below entails great constructive efforts and can, of course, only be provided in cases where the documents to be viewed are transparent.

OBJECT AND SUMMARY OF THE INVENTION

It is an object of the present invention to provide a simple, universally usable method of illumination for a magnifying glass body, which does not interfere with its use.

To attain this object, a magnifying glass body according to the present invention is designed in such a way that at least one lamp is provided in the cylindrical portion in the area between its circumferential surface and the path of the edge light beam passing through the edge of the lens section and the cylindrical portion. At least in the central section of the glass body, between the cylindrical portion and the lens section, an air gap is provided so that light emitted by the lamp is substantially totally reflected by the surface of the cylindrical portion which limits the air gap.

Thus, in a magnifying glass device according to the present invention, a lamp is disposed in the area of the cylindrical portion and is not visible to the viewer because of the optical properties of the lens section. The light from this lamp passes through the cylindrical portion to a surface thereof which limits the air gap between the cylindrical portion and the lens section, and is totally reflected by this surface. In other words, the light emitted by the lamp in the direction of the lens section is reflected away from the lens section and falls onto the surface to be viewed. However, and as previously mentioned, the actual light source is not visible to the user, so that it does not interfere with the use of the magnifying glass device.

The light from the lamp reflected from the surface to be viewed is suitably refracted by the cylindrical portion and the curved lens section and reaches the eye of the viewer from there. Only a very small part of the light reflected from the surface to be viewed again falls onto the surface of the cylindrical portion limiting the air gap at such an angle that it is again totally reflected away from the eye of the viewer.

It should be noted in this connection that the determination of the shape of the surface of the cylindrical portion where total reflection is to take place is made in accordance with well-known optical design rules, taking into consideration the differences in optical densities between the material of the cylindrical portion (normally glass or acrylic glass) and the air. The thickness of the air gap should be as small as possible in order to prevent optical distortions. For this purpose the surface of the cylindrical portion limiting the air gap is generally of a concave curve.

The air gap is preferably placed rotationally symmetrical with respect to the cylindrical axis. The air gap may extend as far as the area of the edge light beam of the lens section, so as to cause total reflection of substantially all the light emitted upwardly or obliquely upwardly by the lamp.

Preferably, a plurality of lamps, placed diametrically opposite to each other in pairs, is used. The lamps may be disposed in an annular groove, formed in the cylindrical portion and radially open towards the outside, so that they can be easily mounted and removed.

These and other objects of the present invention will be described below by means of the drawings, which illustrate exemplary embodiments thereof.

DETAILED DESCRIPTION OF THE PREFERRED EMBODIMENTS

Figure 1:
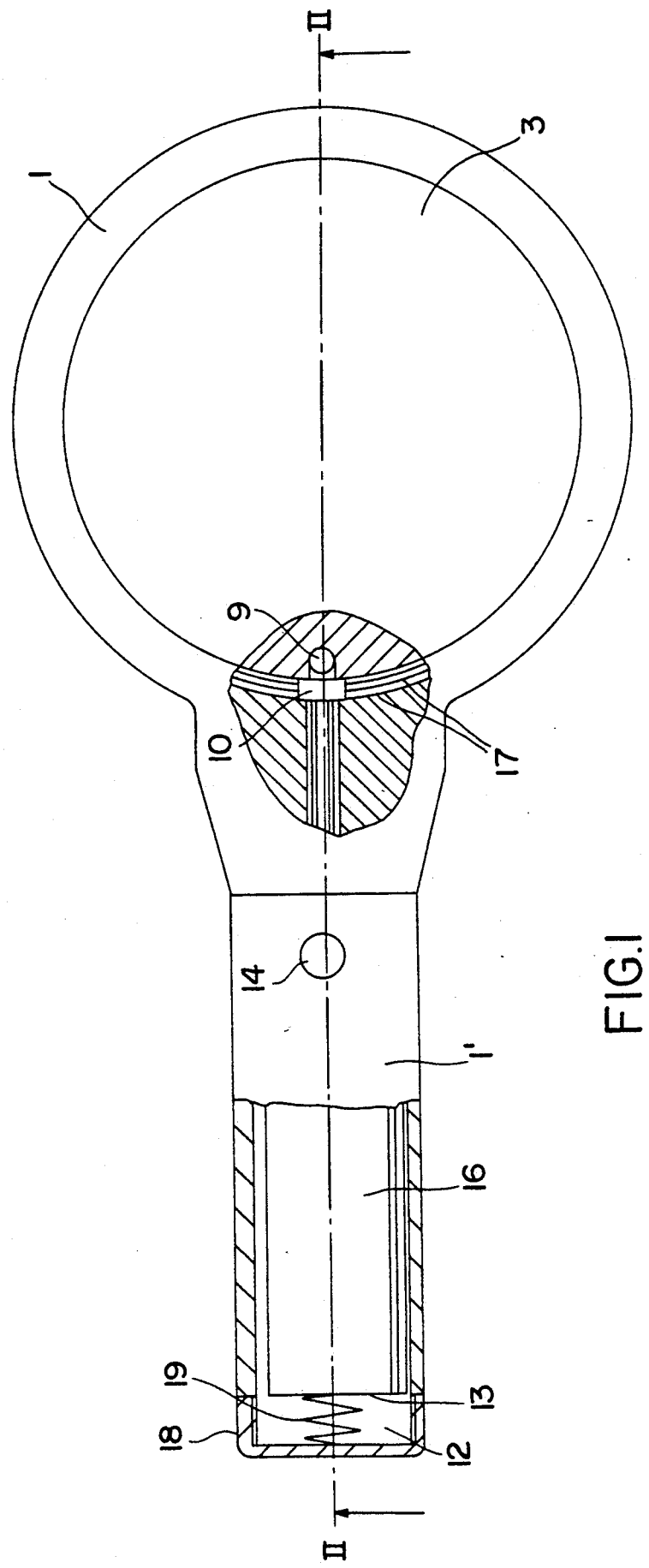
FIG. 1 shows a magnifying glass device in the form of a hand-held magnifying glass, partially in a plan view and partially in a cross-section view.
Figure 2:
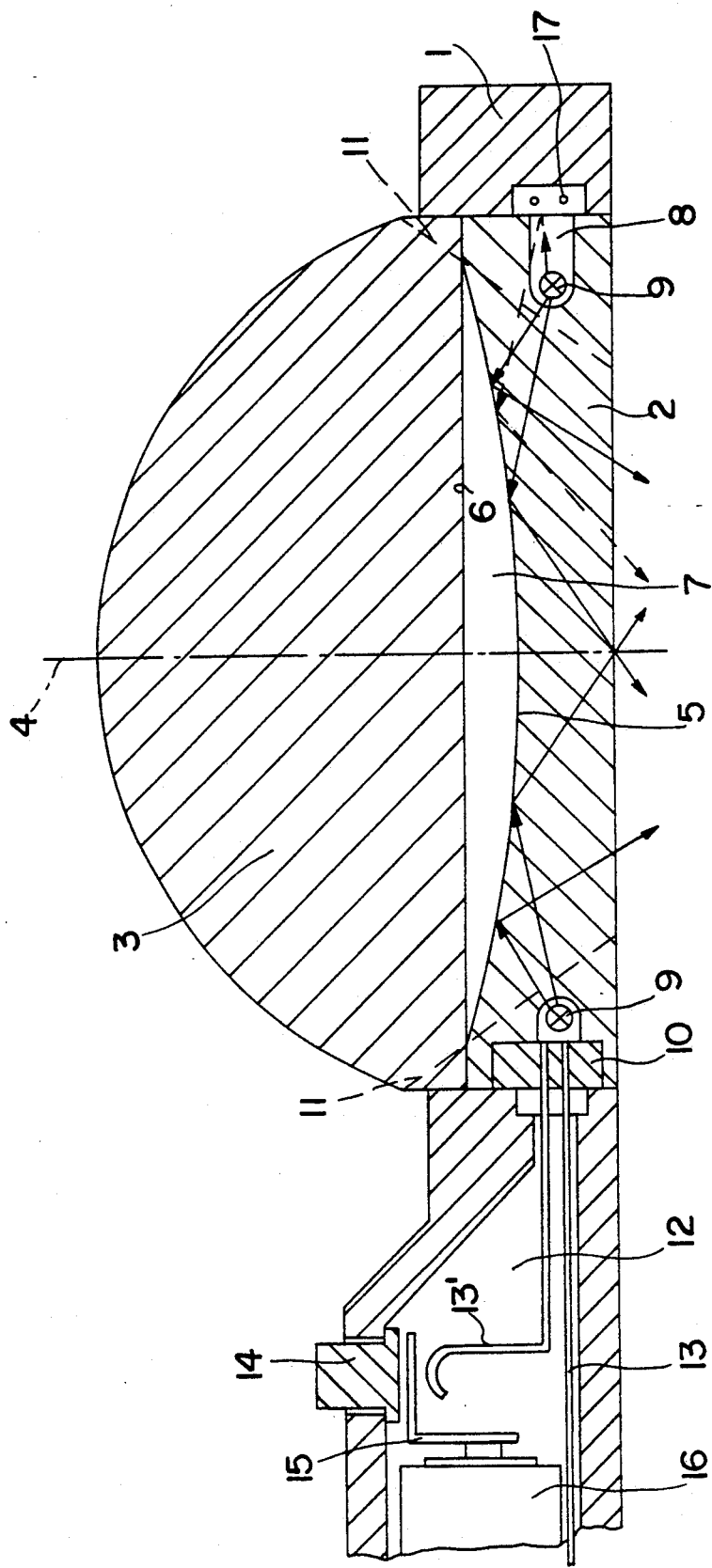
FIG. 2 is a cross-section view taken along the line II—II of FIG. 1.

The magnifying glass device illustrated in FIGS. 1 and 2 comprises a support body 1, in which there is a through-bore into which the lens body is inserted. The support body 1 could, for example, be made of plastic, and the lens body could be made of acrylic glass.

The support body 1 is followed by a handle 1' having an inner chamber 12 in which a battery 16 is housed. The battery 16 is pressed against a contact 15 disposed in the handle 1' by a spring 19 supported on a closure lid 18.

The magnifying glass lens body has a cylindrical lens portion 2 and a curved lens section 3, both of which are rotationally symmetrical with respect to the cylinder axis 4. The lens section 3 is convexly curved. The outer circumferential areas of the cylindrical lens portion 2 and the lens section 3 adjoin each other in a plane and may be fixedly connected to each other by means of an adhesive of the same optical density as the material of the cylindrical lens portion 2 and the lens section 3. A narrow air gap 7 is formed in the central area between the cylindrical lens portion 2 and the lens section 3. This gap is rotationally symmetrical with respect to the cylinder axis 4, and extends as far as the area of the edge light beam 11. The air gap 7 is limited by a flat surface 6 of the lens section 3 and a concave surface 5 of the cylindrical portion 2.

An annular groove 8, radially open towards the outside, is located in the outer circumference of the cylindrical portion 2, and holds a plurality of lamps 9 diametrically opposed to each other by mechanical means. The lamps 9 are held in their positions by structure not shown in detail. On the one hand, the lamps 9 are connected by means of lines 17 in the area of a support block 10 with a line 13, which is connected to a first pole of the battery 16, and on the other hand they are connected with a contact 13'. If the pushbutton 14, located in the handle 1' and accessible from the outside, is pushed in, the contact 15, which is in contact with the second pole of the battery 16, is brought into contact with the contact 13', and the circuit for the lamps 9 is closed.

The position of the lamps 9 is selected in such a way that they are located outside of the area delimited by the indicated edge light beam 11 of the lens section 3, so that the lamps 9 are located in an area not visible to the user.

The light, emitted by the lamps 9 in an upward and obliquely upward direction falls, as indicated by the arrows, onto the concave surface 5 of the cylindrical portion 2 adjoining the air gap 7 and is substantially totally reflected by this surface 5 because of the shape thereof and because of the differences in optical density between the material of the cylindrical portion 2 and the air in the air gap 7. That is, the light propagates in the manner indicated by the arrows onto the surface which is to be viewed by the magnifying glass device. In this manner the area to be viewed is well illuminated without the visual image of the light source interfering with the use of the magnifying glass device.

While exemplary embodiments of the invention have been shown and described, it is to be understood that the invention is only to be limited by the scope of the appended claims.

I claim:

1. Illumination apparatus for an optical magnifying device having a magnifying lens section disposed atop a cylindrical lens section, comprising:
   a light emitting device coupled to the cylindrical lens section and adjacent an outer circumferential surface thereof, for emitting light toward an interior of the cylindrical lens section; and
   a surface of the cylindrical lens section facing the magnifying lens section being formed to cause the light emitted from said light emitting device to be substantially totally reflected from said surface and away from the magnifying lens section.

2. An illuminated magnifying glass comprising:
   a cylindrical lens section having (a) bottom surface, (b) a concave top surface, (c) at least one cavity in an outer circumferential surface thereof, and (d) a cylindrical axis;
   a convexly curved lens section disposed on top of said cylindrical lens section and rotationally symmetrical about said cylindrical axis; and
   an illumination device disposed in said at least one cavity of said cylindrical lens section at a position between an outer circumferential surface of said cylindrical lens section and a path of an edge light beam of said curved lens section passing through said cylindrical lens section, for illuminating an object to be viewed through said magnifying glass;
   said concave top surface of said cylindrical lens section being configured to cause light emitted from said illumination device to be substantially totally reflected away from the curved lens section and toward the object to be viewed.

3. A magnifying glass device with a magnifying glass body having a cylindrical portion and a convexly curved lens section, both of which are rotationally symmetrical with respect to a cylindrical axis of the cylindrical portion, comprising:
   at least one lamp provided in the cylindrical portion in an area between its circumferential surface and a course of an edge light beam of the lens section passing through the cylindrical portion; and
   an air gap being defined by facing surfaces of the cylindrical portion and the lens section to cause light emitted by the lamp to be substantially totally reflected by the facing surface of the cylindrical portion.

4. A magnifying glass device in accordance with claim 1, wherein the air gap is rotationally symmetrical in respect to the cylindrical axis.

5. A magnifying glass device in accordance with claim 4, wherein the air gap extends as far as of the edge beam of the lens section.

6. A magnifying glass device in accordance with claim 5, wherein the facing surface of the cylindrical portion is concavely curved upward.

7. A magnifying glass device in accordance with claim 6, wherein a plurality of lamps are provided in the cylindrical portion and are disposed in pairs diametrically opposed to each other.

8. A magnifying glass device in accordance with claim 7, wherein the lamps are disposed in an outwardly radially open annular groove provided in the cylindrical portion.

9. A magnifying glass device in accordance with claim 5, wherein a plurality of lamps are provided in the cylindrical portion and are disposed in pairs diametrically opposed to each other.

10. A magnifying glass device in accordance with claim 9, wherein the lamps are disposed in an outwardly radially open annular groove provided in the cylindrical portion.

11. A magnifying glass device in accordance with claim 4, wherein a plurality of lamps are provided in the cylindrical portion and are disposed in pairs diametrically opposed to each other.

12. A magnifying glass device in accordance with claim 11, wherein the lamps are disposed in an outwardly radially open annular groove provided in the cylindrical portion.

13. A magnifying glass device in accordance with claim 4, wherein the facing surface of the cylindrical portion is concavely curved upward.

14. A magnifying glass device in accordance with claim 13, wherein a plurality of lamps are provided in the cylindrical portion and are disposed in pairs diametrically opposed to each other.

15. A magnifying glass device in accordance with claim 14, wherein the lamps are disposed in an outwardly radially open annular groove provided in the cylindrical portion.

16. A magnifying glass device in accordance with claim 3, wherein the facing surface of the cylindrical portion is concavely curved upward.

17. A magnifying glass device in accordance with claim 16, wherein a plurality of lamps are provided in the cylindrical portion and are disposed in pairs diametrically opposed to each other.

18. A magnifying glass device in accordance with claim 17, wherein the lamps are disposed in an outwardly radially open annular groove provided in the cylindrical portion.

19. A magnifying glass device in accordance with claim 3, wherein a plurality of lamps are provided in the cylindrical portion and are disposed in pairs diametrically opposed to each other.

20. A magnifying glass device in accordance with claim 19, wherein the lamps are disposed in an outwardly radially open annular groove provided in the cylindrical portion.

* * * * *

UNITED STATES PATENT AND TRADEMARK OFFICE
CERTIFICATE OF CORRECTION

PATENT NO. : 5,021,933

DATED : June 4, 1991

INVENTOR(S) : WERNER CORDES

It is certified that error appears in the above-identified patent and that said Letters Patent is hereby corrected as shown below:

Column 4

Line 33, "claim 1" should read --claim 3--.

Signed and Sealed this

Third Day of November, 1992

*Attest:*

DOUGLAS B. COMER

*Attesting Officer*  Acting Commissioner of Patents and Trademarks